United States Patent [19]

Hashimoto

[11] Patent Number: 4,751,567
[45] Date of Patent: Jun. 14, 1988

[54] IMAGE PICKUP APPARATUS GENERATING A DOT-SEQUENTIAL LUMINANCE SIGNAL INCLUDING PROCESSING CIRCUITRY FOR REDUCING FOLD DISTORTION

[75] Inventor: Seiji Hashimoto, Yokohama, Japan

[73] Assignee: Canon Kabushiki Kaisha, Tokyo, Japan

[21] Appl. No.: 925,459

[22] Filed: Oct. 30, 1986

Related U.S. Application Data

[63] Continuation of Ser. No. 554,369, Nov. 22, 1983, abandoned.

[30] Foreign Application Priority Data

Nov. 26, 1982 [JP] Japan ................... 57-207209

[51] Int. Cl.⁴ ................ H04N 9/077; H04N 9/07; H04N 9/73
[52] U.S. Cl. ................... 358/44; 358/29; 358/43
[58] Field of Search ............ 358/41, 43, 44, 47, 358/29, 50, 48

[56] References Cited

U.S. PATENT DOCUMENTS

| | | | |
|---|---|---|---|
| 4,106,056 | 8/1978 | Nagumo et al. | 358/50 |
| 4,183,052 | 1/1980 | Yamanaka et al. | 358/50 |
| 4,338,625 | 7/1982 | Yamanaka | 358/29 |
| 4,355,327 | 10/1982 | Nagumo et al. | 358/44 |
| 4,473,839 | 9/1984 | Noda | 358/41 |
| 4,496,967 | 1/1985 | Sase et al. | 358/44 |
| 4,553,159 | 11/1985 | Moraillon | 358/44 |

FOREIGN PATENT DOCUMENTS

| | | | |
|---|---|---|---|
| 52-55429 | 5/1977 | Japan | 358/50 |
| 52-73615 | 6/1977 | Japan | 358/29 C |
| 52-73616 | 6/1977 | Japan | 358/29 C |
| 53-70625 | 6/1978 | Japan | 358/48 |
| 53-75822 | 7/1978 | Japan | 358/48 |
| 53-139428 | 12/1978 | Japan | 358/50 |
| 54-126424 | 10/1979 | Japan | 358/50 |
| 57-41091 | 3/1982 | Japan | 358/44 |
| 57-50186 | 3/1982 | Japan | 358/29 C |
| 57-58485 | 4/1982 | Japan | 358/29 C |
| 58-3489 | 1/1983 | Japan | 358/41 |
| 58-36091 | 3/1983 | Japan | 358/50 |
| 58-151789 | 9/1983 | Japan | 358/44 |
| 58-172085 | 10/1983 | Japan | 358/44 |

*Primary Examiner*—James J. Groody
*Assistant Examiner*—Randall S. Svihla
*Attorney, Agent, or Firm*—Fitzpatrick, Cella, Harper & Scinto

[57] ABSTRACT

An image pickup apparatus includes an image pickup device and a plurality of color filter groups associated with the device. Each of the filter groups has a different transmission characteristic. The pickup device generates an output signal representative of incident radiation. A color separating circuit separates color signals corresponding to the color filter groups from the output generated by the image pickup device. A control device adjusts the level of at least one of the signals separated by the color separation circuit and a dot-sequential signal forming circuit converts the signals, the levels of which are adjusted by the control device into a dot-sequential signal. The dot-sequential signal so formed is the result of separated color signals and benefits from less stringent frequency requirements for various switching, filtering, and gain control elements. Each of the plurality of color filter groups comprises a plurality of filter cells and the cells are repeatingly arranged at a predetermined pitch. The color separation device also includes sample and hold circuits for sampling and holding each of the color signals on the basis of the arrangement of the filter cells.

44 Claims, 6 Drawing Sheets

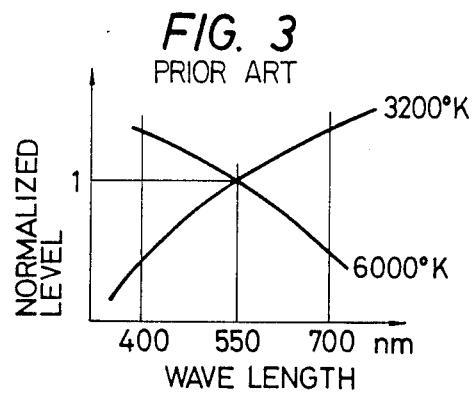
FIG. 3
PRIOR ART
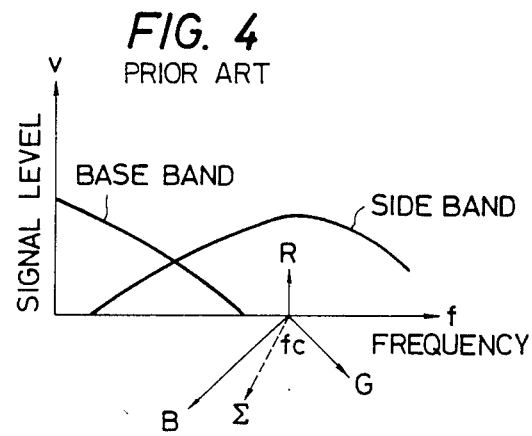
FIG. 4
PRIOR ART
FIG. 7
| COLOR FILTER | SW2 | SW3 |
|---|---|---|
| R.G.B | a | d |
| R.G.Cy | a | c |
| Ye.G.Cy | b | c |

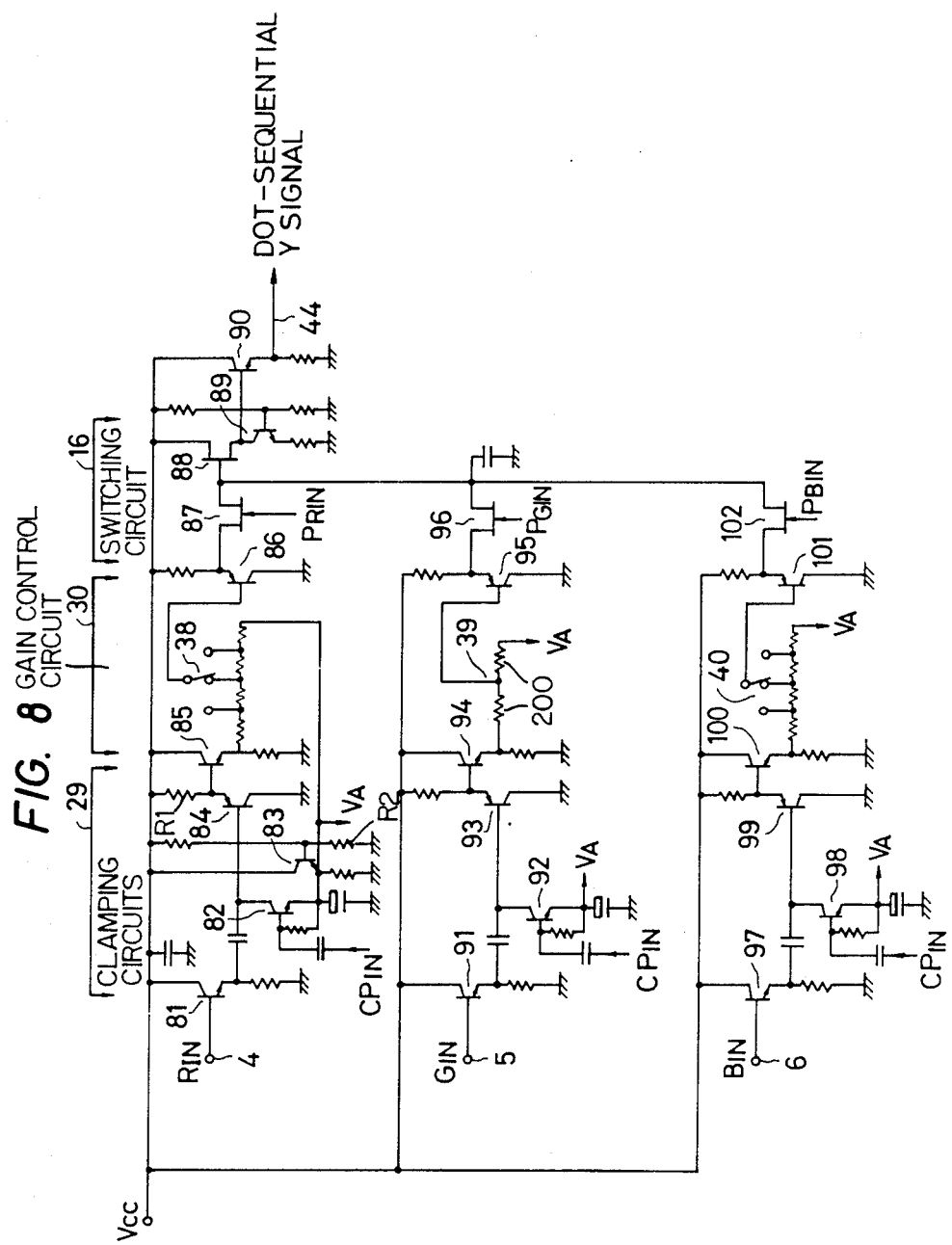

IMAGE PICKUP APPARATUS GENERATING A DOT-SEQUENTIAL LUMINANCE SIGNAL INCLUDING PROCESSING CIRCUITRY FOR REDUCING FOLD DISTORTION

This application is a continuation of application Ser. No. 554,369, filed 11/22/83, now abandoned.

FIELD OF THE INVENTION

The present invention relates to an image pickup apparatus using an image pickup device and, more particularly, to a color image pickup apparatus having a signal processing circuit for reducing fold distortion.

BACKGROUND OF THE INVENTION

Conventionally, in color image pickup apparatus of this kind, an image pickup device (a CCD or the like) provided with a plurality of color separation filters, for example stripe filters, having different spectroscopic characteristics is used.

For example, the case is considered where a red light (R) transmission filter, green light (G) transmission filter, and blue light (B) transmission filter (hereinafter, simple called R filter, G filter and B filter) are sequentially arranged on the surface of the image pickup device as shown in FIG. 1. The incident rays transmitted through such filters and an optical system to the image pickup device are spatially sampled by the above-mentioned color stripe filters and image pickup device. However, in this case, for the spatial sampling frequency 3fc (fc being the spatial sampling frequency for one of the plurality of colors) to be determined on the basis of the number of picture elements of the image pickup device or the pitch of the color stripe filter and the readout speed of the signal of each picture element, the spatial frequency component of the incident rays which are equivalent to not lower than ½ of this 3fc becomes a cause of the fold distortion (also called frequency aliasing noise). This point will be described hereinbelow with reference to FIGS. 2A to 2C. In FIGS. 2A to 2C, the abscissa indicates the frequency and the ordinate represents the signal level.

The incident rays sampled on the image pickup device are readout as an image pickup signal from the image pickup device due to the photoelectric conversion action thereof, or the like. Now, when attention is paid to only the image signal of R (or only G or B), its repetitive frequency is ⅓ of the readout frequency 3fc. If this repetitive frequency is fc, the base band component and side band component of the incident rays due to the sampling are as shown in FIG. 2A, and the hatched section is called a fold distortion component. When this signal passes through a low-pass filter having such a characteristic as shown in FIG. 2B, this fold component is mixed with the base band component and remains, so that this component will cause the picture quality on a display remarkably to deteriorate. A method of reducing such fold distortion is disclosed in Japanese Unexamined Patent Publication (Kokai) No. 56-120281. That is to say, as shown in FIG. 2C, when an achromatic color object image is pictured, if the transmission characteristics of the color separation filter are designed in such a manner that the levels of the dot-sequential signals to be output from the image pickup device are 1:1:1, the vectors of the side band components will be cancelled mutually, so that this enables the fold distortion to be reduced.

According to this method described above, it is possible to reduce the fold distortion with respect to at least an achromatic color screen.

Of course, such an effect cannot be obtained with respect to the screen with high color saturation. However, this point may be ignored since the luminous efficiency characteristic (or factor) of the human eye does not correspond to the spectral sensitivity characteristic of the image pickup device and is lower with respect to the color on the higher frequency side.

However in the above-described case, when the color temperature of a light source for picturing differs in dependence upon the objects or locations of picturing, the dot-sequential signal levels become unbalanced, so that the fold distortion would have eventually occurred. FIG. 3 shows the spectroscopic energies at color temperatures of, e.g. 3200° K. and 6000° K. FIG. 4 is a diagram showing the drawback in the case where the color separation filter was designed such the the dot-sequential output signal levels become constant at, e.g., 3200° K. Even if the filter was set such that the color temperature levels of R, G and B become 1:1:1 at 3200° K., the level on the longer wavelength side, i.e. on the R side will have become weak and that on the B side will, on the contrary, have become strong at 6000° K. as shown in FIG. 4. Thus, the vectors of the side band will have been deflected on the side of cyan (Cy) as shown in FIG. 4, causing the fold distortion to occur.

Furthermore, since the image pickup device generally has a high sensitivity for infrared rays and there is a discrepancy with respect to the luminous efficiency between the human eye and the image pickup device, a filter to cut the infrared rays is provided in the incident light path to the image pickup device to prevent this drawback. However, variation in frequency characteristic of this kind of filter occurs due to the variation in thickness caused in the manufacturing process thereof. As a result of this fact, there may be a case where the R signal level will change.

As a method of eliminating such a drawback as described above, the following two methods are principally known.

One method is to utilize a mechanical color temperature compensation filter. With this method color temperature compensation filters for, e.g., daylight, fluorescent lamp and tungsten are generally mainly prepared and they are changed over in accordance with the imaging locations. This method has drawbacks such that several kinds of compensation filters are needed and that it is impossible to completely prevent the occurrence of fold distortion due to imperfect level adjustment of the dot-sequential signal levels.

The other method is to provide means for multiplying the control signals in such a manner that the dot-sequential signal levels of R, G and B become 1:1:1 as set forth in Japanese Unexamined Patent Publication (Kokai) No. 57-26977. According to this method it is possible in principle to accurately match the signal levels, but there is a drawback such that the circuit becomes extremely complicated since the control signal multiplication means is driven at high frequency. That is, when the sampling frequency of each color signal is about 3.8 MHz, respectively, the image pickup device has to be driven at about 11 MHz in order to obtain the three color signals, but in this case, the dot-sequential pulses to form the luminance signals also become about 11 MHz.

In addition, to perform the dot-sequence processing with the timing with a certain degree of accuracy, the leading edge of the dot-sequential pulse must have the component of about 30 MHz, which is approximately three times that of the dot-sequential pulse. However, there is a drawback such that it is extremely difficult to simultaneously correctly adjust the levels in such a high frequency region.

SUMMARY OF THE INVENTION

It is an object of the present invention to provide a signal processor which can easily adjust the dot-sequential signal levels in consideration of such conventional drawbacks as described above.

Another object of the invention is to provide an image pickup apparatus with a simple construction by which stable characteristics can be obtained.

BRIEF DESCRIPTION OF THE DRAWINGS

FIG. 3 is a diagram showing the spectroscopic energies due to a difference between image pickup light sources;

FIG. 4 is a diagram for describing the occurrence of the fold distortion due to the unbalanced dot-sequential signal levels;

FIG. 7 is a diagram showing examples of the combination with respect to the connection of the switches SW2 and SW3 shown in FIG. 6; and FIGS. 8 and 9 are diagrams showing a gain control circuit and a dot-sequential switching circuit as first and second embodiments, respectively.

DETAILED DESCRIPTION OF THE PREFERRED EMBODIEMTNS

Figure 5:
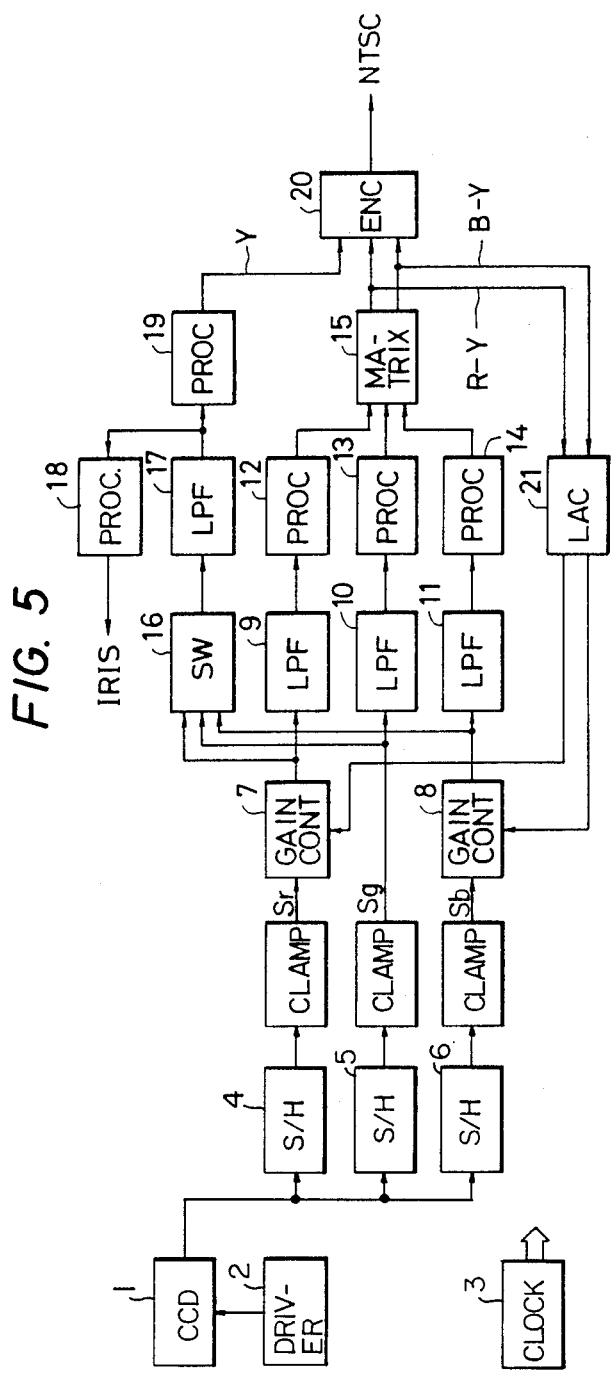
FIG. 5 is a diagram showing an image pickup apparatus as a first embodiment according to the present invention.

FIG. 5 shows an embodiment of the present invention.

Figure 1:
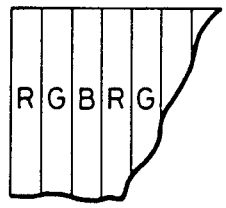
FIG. 1 is a diagrammatical view showing a color separation filter.
Figure 2A:
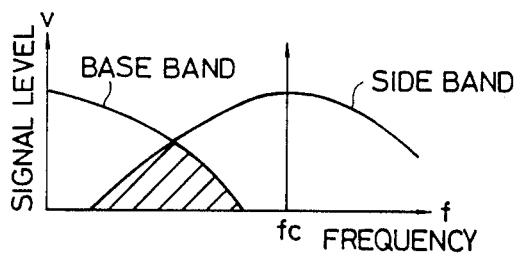
FIGS. 2A, 2B and 2C are diagrams for describing fold distortions, respectively.
Figure 2B:
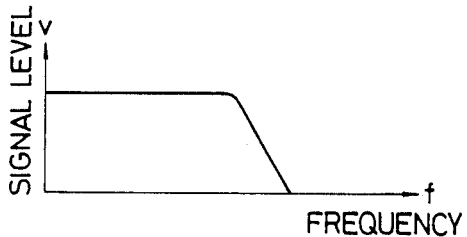
Figure 2C:
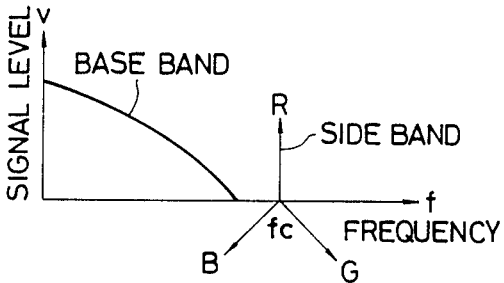

A filter such as shown in FIG. 1 is attached on the surface of an image pickup device 1 (a CCD in this embodiment) to be driven by a clock IC 3 and a driver 2. As an output signal of the device 1, a dot-sequential signal consisting of of repetitive signals of R, G and B corresponding to the color separation filter is obtained. This dot-sequential signal is separated into the color signals of Sr, Sq and Sb by sample and hold circuits 4, 5 and 6 acting as color separation means for performing the sampling of the frequency of fc/3 of which the phases are shifted by one pitch from each other. The Sr and Sb signals among these signals are introduced to gain control circuits 7 and 8 acting as gain control means at the next stage according to the present invention, whereby their levels are adjusted to be identical to that of the Sg signal by control signals from a level adjusting circuit LAC 21. This gain control method for the Sr, Sg and Sb signals may be substantially the same as the method of adjusting the white balance that has been generally adopted so far as will be described later.

It should be noted that the present invention largely differs from a conventional one in that the gain control circuits 7 and 8 are provided immediately after the sample and hold circuits 4 and 6. In other words, the outputs of the sample and hold circuits 4 and 6 are gain controlled before low-frequency filtering by low-pass filters 9 and 11. Another point of difference is that the luminance signal is formed by again performing the dot-sequence processing of each color signal after the gains of signal Sr and signal Sb are controlled with reference to the signal Sg. The cut-off frequencies of low-pass filters 9 to 11 are set, e.g., to 500 kHz. The Sr, Sg and Sb signals of which the clock components or the like were eliminated by the low-pass filters 9 to 11 are subjected to signal processing such as γ correction, white clipping, or the like by processors 12 to 14 and thereafter they are converted into color difference signals R-Y and B-Y by a matrix circuit 15. These color difference signals are input to an encoder 20 and are added to a Y signal which will be described later.

On the other hand, the color difference signals R-Y and B-Y are together compared in the level adjusting circuit LAC 21 and the gain control circuits 7 and 8 are controlled so that the respective levels are well balanced.

Furthermore, the Sr, Sg and Sb signals before entering the low-pass filters 9 to 11 are again converted into a dot-sequential signal by a switch 16 acting as means for forming the dot-sequential signal according to the present invention. The switch comprises a multiplexer or a sample and hold circuit, or the like.

As the switch 16 mentioned here, it is possible to use any means for sampling the Sr, Sg and Sb signals with the same frequency as the sampling frequency of the image pickup device 1 and synchronously therewith, and for converting these signals into a dot-sequential signal.

The clock component of the signal which was converted into the dot-sequential signal by the above-mentioned switch 16 is eliminated by a low-pass filter 17 having a relatively wide pass band, for example, having a high cut-off frequency of several MHz. This signal is further subjected to signal processing such as γ correction, white clipping, or the like by a processor 19. The output of the low-pass filter 17 is connected to an auto-iris IRIS through a processor 18 to control the amount of incident rays to the image pickup device so as to be a predetermined optimum value.

The luminance signal Y and color difference signals R-Y and B-Y thus obtained in the manner as described above are converted into a standard television signal such as an NTSC signal by the encoder 20 as already described and this standard television signal is output.

Figure 6:
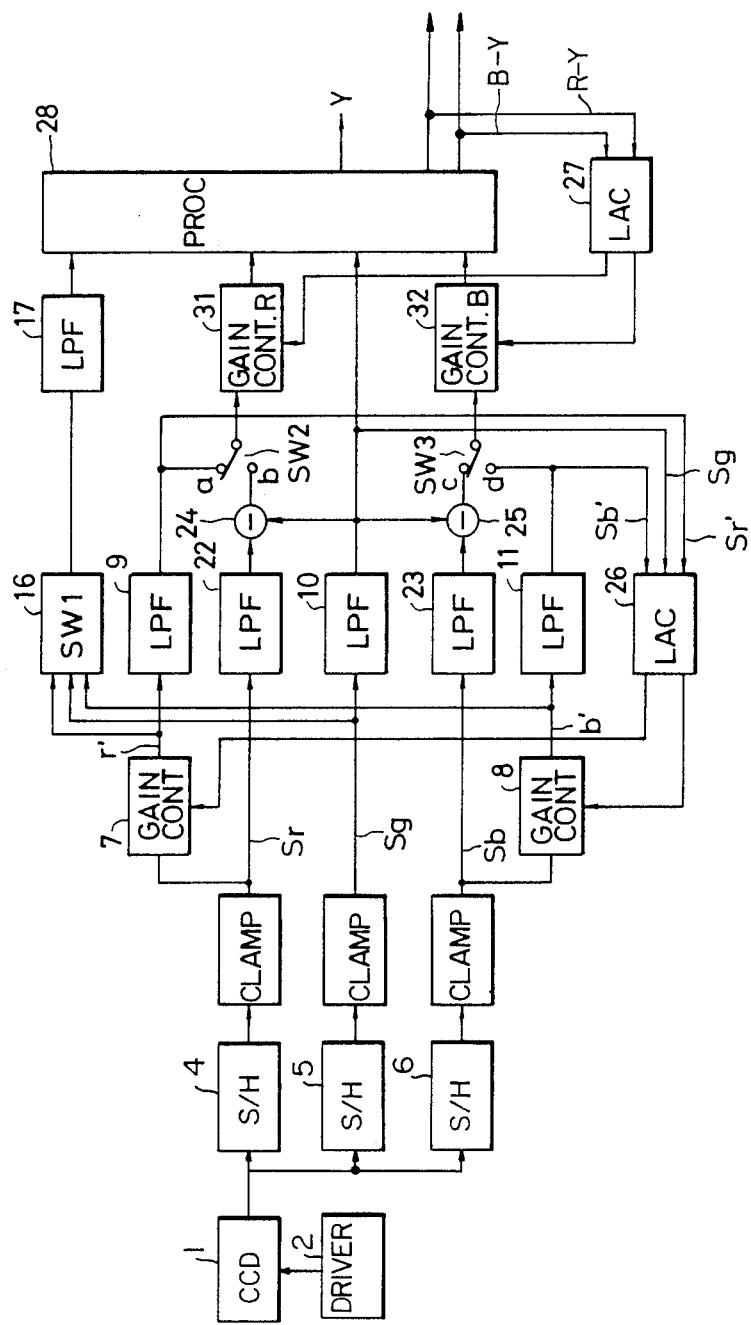
FIG. 6 is a diagram showing an image pickup apparatus as a second embodiment according to the present invention.

FIG. 6 is a block diagram showing another embodiment of the present invention. This embodiment is constructed so that it can process the output from a combination of color separation filters such as R.G.B, R.G.Cy, or Ye.G.Cy, or the like. This circuit construction has features such that the levels of the signals Sr, Sg and Sb which were color separated by the sample and hold circuits 4, 5 and 6 are matched by the gain control circuits 7 and 8, and thereafter those signals are converted into the dot-sequential signal to produce the luminance signal. Further, this circuit has features such that the operation on the color signals in complementary color filtering is performed on the signal which does not pass through the above-mentioned gain control circuits. Reference numerals 22 and 23 denote low-pass filters having substantially the same cut-off characteristics as those of the low-pass filters 9 to 11; 24 and 25 denote subtractors; 26 and 27 denote level adjusting circuits; and 28 denotes a processor.

In addition, FIG. 7 is a diagram showing examples of connections of the switches SW2 and SW3 in accordance with the combination of the color separation filters. When the color separation filters are R.G.B, the color separation signal Sr corresponds to the signal from the R filter; Sg to the signal from the G filter; and Sb to the signal from the B filter. The switch SW2 is connected to the pole a and the switch SW3 is connected to the pole d. Therefore, the signal processing method in this case is the same as the case of the embodiment of FIG. 5.

When the color separation filters are R.G.Cy, the color separation signal Sr corresponds to the signal from the R filter; Sg to the signal from the G filter; and Sb to the signal from the Cy filter. The switch SW2 is again connected to the pole a, while the switch SW3 is connected to the pole c. Namely, the signal processing of the Sr signal is the same as the case of FIG. 5, but the signal processing of the Sb signal is changed. The Sb signal is processed by subtracting the output signal Sg of the low-pass filter 10 from the output signal Sb representing Cy of the low-pass filter 23 with the subtracter 25.

The Sb signal representing Cy to which the level matching was performed is not used in this subtracting operation of Sb (representing Cy)—Sg (representing G) in the present invention. This is because when the color temperature of the imaging light source differs as shown in FIG. 3, since the frequencies of B and G comprising the Cy signal are different, if one tries to carry out the operation of Sb—Sg after matching the levels of the signal Sg representing G with the level of the signal Sb representing Cy, it will be needed to change the subtraction coefficient of the subtractor 25 in dependence upon the color temperatures of the imaging light source.

When the color separation filters are, for example, Ye (yellow), G and Cy, the color separation signal Sr corresponds to the Ye filter; Sg to the G filter; and Sb to the Cy filter. However, at this time, since the switch SW2 is connected to the pole b, the Sr signal due to the operation of Ye—G is obtained by the subtracter 24 and the switch SW3 is connected to the pole c, so that the B signal can be derived. The Sr' and Sb' signals through these switches SW2 and SW3 are introduced to the processor 28 through gain control circuits 31 and 32, while the Sg signal is directly introduced from the low-pass filter 10 to the processor 28. The signals Y, B-Y and R-Y from this processor 28 are sent to the encoder in the same manner as previously described, thereby obtaining a standard television signal like the NTSC signal. The level adjusting circuit 26 compares the levels of the Sg signal with those of the Sr' and Sb' signals and serves to control the gain control circuits 7 and 8 so that the level difference is not caused. In addition, this loop is constituted in such a manner that it is closed by a switch (not shown) only when an achromatic color object was viewed. When this loop is opened, the gains of the gain control circuits 7 and 8 are fixed.

The level adjusting circuit 27 compares the levels of the R-Y and B-Y signals obtained from the processor 28 and serves to control the gain control circuits 31 and 32, respectively, so that both signals are balanced.

Similarly to the loop of the previously mentioned level adjusting circuit 26, this loop is also closed by a switch (not shown) only when an achromatic color object is viewed. While this loop is open, the gains of the gain control circuits 31 and 32 are fixed.

Although the image pickup apparatus of the single plate type has been considered and it was constituted so as to correspond to three kinds of color separation filters in the embodiment shown in FIG. 6, the image pickup apparatus of the two or three plate type may be used and the color filters are not limited to the three kinds. Furthermore, a combination of other kinds of filters may be used.

In the above embodiments, the level adjusting circuits 26 and 27 detect the balance state of the color signals are color difference signals as the output of the image pickup device, thereby controlling the gain control circuits 7, 8, or 31, 32 so that these color signals are color difference signals are balanced for an achromatic color object. However, it may be possible to provide a sensor to detect the color temperature separately from the image pickup device for example and thereby the gain control circuits are always controlled in response to an output of this sensor. With such a constitution, even if an achromatic color object is viewed, there will be an effect such that the white balance is always automatically adjusted.

FIG. 8 shows a diagram as a practical circuit example to convert the outputs of the gain control circuits 7 and 8 and the Sg signal in the circuit shown in FIGS. 5 and 6 into a dot-sequential signal. Vcc denotes a power supply; $R_{IN}$, $G_{IN}$ and $B_{IN}$ respectively denote terminals to which signals Sr, Sg and Sb are conducted; $CP_{IN}$ is a clamp pulse for determining a clamp timing and VA is a clamp level determined, e.g., by resistors R1 and R2 connected to the base of a transistor, e.g., the transistor 83. In this drawing, the section to convert the outputs of the sample and hold circuits into a dot-sequential output is shown. A reference numeral 29 represents clamping circuits to which the outputs of the sample and hold circuits 4 to 6 are input respectively and in which their DC components are clamped. The outputs of the clamping circuits 29 are input to gain control circuits 30, respectively, and the gains of the Sr and Sb signals are adjusted. In this diagram, the circuit is constituted such that the gain control is manually controlled using change-over switches 38 and 40. In addition, the level of the Sg signal has been preliminarily fixed by voltage dividing resistors 200. Of course, the Sg signal level may be also adjusted if it is needed. The outputs of the gain control circuits 30 are respectively introduced to the switching circuit 16 for the dot-sequence conversion, where they are converted into a dot-sequential signal by pulses $P_{RIN}$, $P_{GIN}$ and $P_{BIN}$ to be sequentially supplied, thereby obtaining the Y signal from an output terminal 44. In FIG. 8, reference numerals 81 to 102 indicate transistors.

Figure 9:
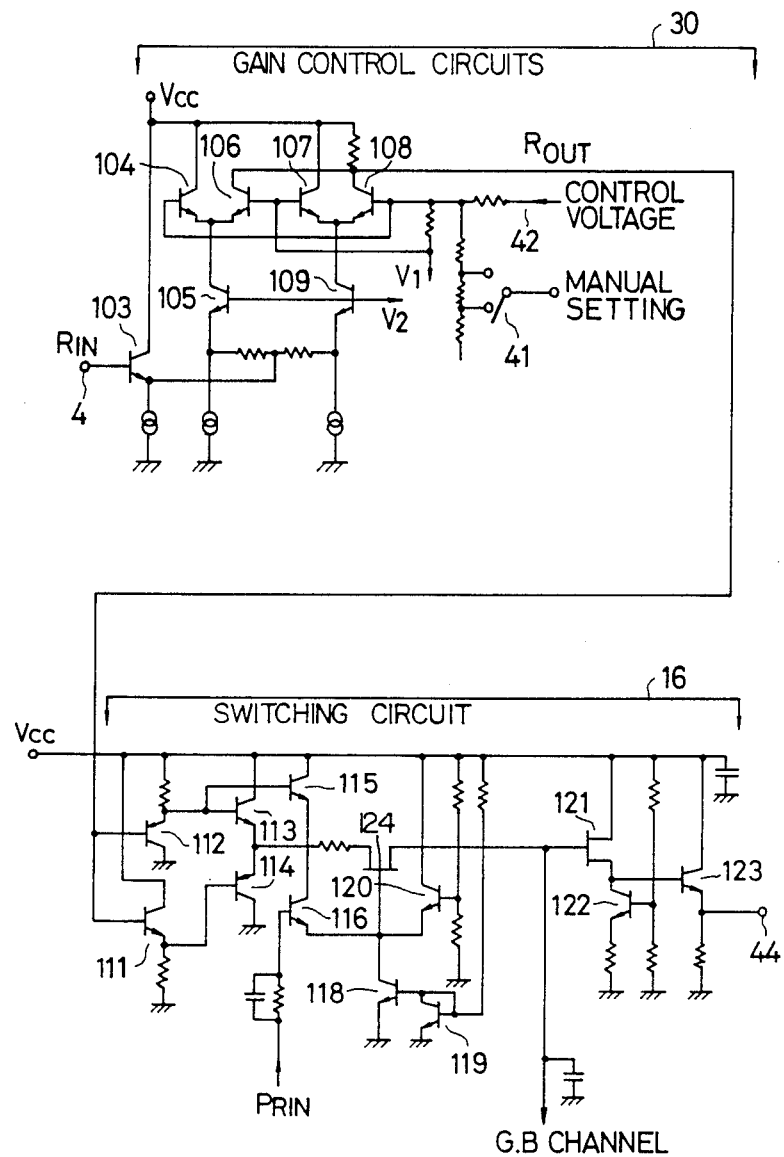

Referring now to FIG. 9, there is shown a diagram of other embodiments of the gain control circuits 30 and dot-sequence switching circuit 16 of the present invention. Although only the system for the Sr signal is shown in the diagram, the systems of the Sg and Sb signals may have substantially the same constitution. In FIG. 9, $V_{CC}$ denotes a power supply; $V_1$, and $V_2$ denote first and second reference voltages; $R_{OUT}$ denotes an output signal from the R channel; $P_{RIN}$ denotes a timing signal for determining the timing of outputting the signal from the R channel to the FET 121 by turning on FET 124. Of course, only the R channel is shown. G.B. CHANNEL indicates that the same type channels are provided for the Sg and Sb signals.

The gain control circuits in this embodiment are constituted in such a manner that the gains can be adjusted by means of a manual setting switch 41 or a signal of the level adjusting circuit to be input to a control input terminal 42. In FIG. 9, reference numerals 103 to 109, 111 to 116, and 118 to 123 denote transistors.

As described above, each color signal is separated from the dot-sequential signal to be obtained from the image pickup device is separated and the levels of these color separation signals are matched, and thereafter the dot-sequential signal is again produced and this dot-sequential signal is used as a luminance signal, so that the following effects are obtained.

First, it is not necessary to use the color temperature compensation filter, so that this simplifies the construction and enables the apparatus to be miniaturized and lightened, thereby making it possible to eliminate the complexity in switching operation of the color temperature compensation filter.

Second, it is possible to perform the level matching of the dot-sequential signal accurately. This enables the fold distortion to be remarkably reduced. In addition, such an effect can be accomplished by a simple constitution.

That is to say, this adjustment can be easily made since the gains of each color signal are adjusted with the relatively low frequency which was sampled and held before producing the luminance signal by converting the color signals into the dot-sequential signal.

Moreover, in the case where the combination of the color filters consists of the three primary colors R, G and B, the circuit arrangement is simplified since the level adjusting circuits of each color signal to prevent the fold distortion of the luminance signal and the level adjusting circuits for the adjustment of white balance are utilized as a common circuit. In addition, in the case where the combination of the color filters includes complementary colors, i.e. such as R, G and Cy, or W, Ye and Cy, the arithmetic circuit to obtain the principal color components from the complementary signals can be simply constituted since the level adjusting circuits for each color signal to prevent the fold distortion of the luminance signal and the level adjusting circuits for the adjustment of white balance are separately provided and are connected in series. It is also possible to set the gain control ranges of the level adjusting circuits for white balance into relatively narrow ranges.

In the embodiments, the gain control circuit to adjust the G color signal level is not provided to adjust the levels of each color signal for the purpose of formation of the luminance signal; however, it is of course possible to constitute in such a manner that the G color signal is also gain controlled.

What I claim is:

1. An image pickup apparatus comprising:
   image pickup means for generating an output signal and a plurality of color filter groups associated with said image pickup means, each of said plurality of color filter groups comprising a plurality of color filter cells having different color transmission characteristics, with said plurality of color filter cells being repeatedly arranged at a predetermined pitch;
   color separation means for separating color signals corresponding to said color transmission characteristics from the output signal generated by said image pickup means;
   control means for generating a set of level-adjusted signals by adjusting the level of at least one of the color signals separated by said color separation means;
   dot-sequential signal forming means for converting into a dot-sequential signal the level-adjusted signals generated by said control means and at least one of the color signals separated by said color separation means; and
   processing means for processing the dot-sequential signal into a luminance signal;
   said color separation means including sample-and-hold circuits for sampling and holding the output signal on the basis of the arrangement of said color filter cells.

2. An image pickup apparatus according to claim 1, wherein said dot-sequential signal forming means includes a switch for selecting the signals to be converted into the dot-sequential signal.

3. An image pickup apparatus according to claim 1, wherein said dot-sequential signal forming means performs said dot-sequence conversion at a sampling frequency determined by the predetermined pitch at which said plurality of color filter cells are repeatedly arranged.

4. An image pickup apparatus according to claim 1, further comprising clamp means for clamping the color signals separated by said color separation means.

5. An image pickup apparatus according to claim 1, further including low-pass filters for filtering signals corresponding to the color signals separated by said color separation means.

6. An image pickup apparatus according to claim 5, further comprising clamp means for clamping the color signals separated by said color separation means.

7. An image pickup apparatus according to claim 1, wherein said control means is operable to adjust the white balance of the set of level-adjusted signals.

8. An image pickup apparatus according to claim 7, further comprising clamp means for clamping the color signals separated by said color separation means.

9. An image pickup apparatus comprising:
   image pickup means for generating a plurality of outputs;
   clamp means for generating clamped outputs by clamping each of the plurality of outputs generated by said image pickup means to a reference level;
   switch means for sequentially selecting the clamped outputs to provide a dot-sequential signal; and
   control means for controlling the levels of the outputs generated by said image pickup means based on the level of the dot-sequential signal.

10. An image pickup apparatus according to claim 9, further comprising a plurality of color filter groups for filtering an input to said image pickup means, each of said plurality of color filter groups comprising a plurality of color filter cells having different color transmission characteristics.

11. An image pickup apparatus according to claim 9, wherein said clamp means simultaneously clamps the plurality of outputs to the reference level.

12. An image pickup apparatus according to claim 11, further comprising second control means for timing the operation of said clamp means.

13. An image pickup apparatus according to claim 9, wherein said image pickup means generates three outputs.

14. An image pickup apparatus according to claim 13, wherein said image pickup means is associated with color filters corresponding to three colors so that the three outputs generated by said image pickup means each correspond to a different one of the three colors.

15. An image pickup apparatus comprising:
   image pickup means and a plurality of optical filter assemblies associated with said image pickup means, each of said plurality of optical filter assemblies having a different color transmission characteristic, said image pickup means generating signals corresponding to radiation incident thereon through said optical filter assemblies;
   separation means for separating the signals generated by said image pickup means in accordance with the respective color transmission characteristics of said optical filter assemblies;
   clamp means for generating clamped outputs by clamping the signals separated by said separation means to a reference level;
   switch means for sequentially selecting the clamped outputs to provide a dot-sequential signal; and
   processing means for processing the dot-sequential signal into a luminance signal.

16. An image pickup apparatus according to claim 15, wherein said plurality of optical filter assemblies are arranged to form a reptitious pattern, and wherein said separation means includes sample-and-hold circuits for sampling and holding the signals generated by said image pickup means on the basis of the arrangement of said plurality of optical filter assemblies.

17. An image pickup apparatus according to claim 15, further comprising level adjusting means provided between said separation means and said switch means for adjusting a level of at least one signal separated by said separation means.

18. An image pickup apparatus according to claim 15, further comprising control means for controlling the levels of the signals generated by said image pickup means based on the luminance signal.

19. An image pickup apparatus according to claim 18, further comprising limiting means for limiting the radiation incident on said image pickup means, wherein said control means controls said limiting means based on the luminance signal.

20. An image pickup apparatus according to claim 19, wherein said limiting means includes a stop having an adjustable opening for limiting the radiation incident on said image pickup means and said control means controls said opening of said stop to become smaller when the level of the luminance signal increases.

21. An image pickup apparatus according to claim 15, wherein said processing means includes a low-pass filter.

22. An image pickup apparatus comprising:
   image pickup means and a plurality of color filters having different color transmission characteristics associated with said image pickup means, said image pickup means generating a signal in accordance with radiation incident thereon through said color filters;
   color separation means for separating color signals corresponding to said different color transmission characteristics from the signal generated by said image pickup means;
   first control means for generating a first set of level-adjusted signals by adjusting the level of at least one of the color signals separated by said color separation means;
   means for selecting particular signals of the first set of level-adjusted signals to provide a dot-sequential signal;
   processing means for processing the dot-sequential signal into a luminance signal;
   means for filtering the first set of level-adjusted signals; and
   second control means for generating a second set of level-adjusted signals by adjusting the level of at least one signal filtered by said filtering means.

23. An image pickup apparatus according to claim 22, wherein said plurality of color filters include three primary color filters comprising a red filter, a green filter, and a blue filter.

24. An image pickup apparatus according to claim 22, wherein said first control means adjusts the level of at least one of the color signals separated by said color separation means to have a predetermined relationship with another one of the color signals separated by said color separation means.

25. An image pickup apparatus according to claim 24, wherein said first control means adjusts the level of at least one of the color signals separated by said color separation means such that the white balance of the first set of level-adjusted signals satisfies a predetermined relation.

26. An image pickup apparatus according to claim 22, wherein said second control means adjusts the level of at least one signal filtered by said filtering means to have a predetermined relationship with another signal filtered by said filtering means.

27. An image pickup apparatus according to claim 26, wherein said second control means adjusts the level of at least one signal filtered by said filtering means such that the white balance of the signals satisfies a predetermined relation.

28. An image pickup apparatus comprising:
   image pickup means and a plurality of optical filters having different kinds of color transmission characteristics associated with said image pickup means, said image pickup means generating signals corresponding to radiation incident thereon through said optical filters;
   separation means for separating the signals generated by said image pickup means in accordance with the respective color transmission characteristics of said optical filters;
   switch means for sequentially selecting the signals separated by said separation means to provide a dot-sequential signal; and
   processing means for processing the dot-sequential signal into a luminance signal.

29. An image pickup apparatus according to claim 28, wherein said plurality of optical filters are arranged to form a repetitious pattern, and wherein said separation means includes sample-and-hold circuits for sampling and holding said signals generated by said image pickup means on the basis of the arrangement of said plurality of optical filters.

30. An image pickup apparatus according to claim 28, further comprising level adjusting means provided between said separation means and said switch means for adjusting the level of at least one signal separated by said separation means.

31. An image pickup apparatus according to claim 28, further comprising control means for controlling the levels of the signals generated by said image pickup means based on said luminance signal.

32. An image pickup apparatus according to claim 31, further comprising means for limiting the radiation incident on said image pickup means, wherein said control means controls said limiting means based on said luminance signal.

33. An image pickup apparatus according to claim 32, wherein said limiting means includes an iris having an adjustable opening for limiting the radiation incident on said image pickup means and said control means controls said opening of said iris to become smaller when the level of the luminance signal increases.

34. An image pickup apparatus comprising:
a single image pickup means and a plurality of color filter assemblies associated with said image pickup means, said color filter assemblies each having a different color transmission characteristic, said image pickup means generating an output signal;
color separation means for separating color signals corresponding to said color filter assemblies from the output signal generated by said image pickup means;
control means for generating a set of level-adjusted signals by adjusting the level of at least one of the color signals separated by said color separation means;
dot-sequential signal forming means for converting the set of level-adjusted signals into a dot-sequential signal; and
processing means for processing the dot-sequential signal into a luminance signal.

35. An image pickup apparatus according to claim 34, wherein each of said plurality of color filter assemblies includes a plurality of filter cells, said cells being arranged to form a repetitious pattern, and said color separation means includes sample-and-hold circuits for sampling and holding the output signal in accordance with the arrangement of said filter cells.

36. An image pickup apparatus according to claim 34, wherein said dot-sequential signal forming means includes a switch for selecting particular ones of the set of level-adjusted signals for output as one dot-sequential signal.

37. An image pickup apparatus according to claim 34, wherein said dot-sequential signal forming means samples particular ones of the set of level-adjusted signals at a sampling frequency determined by a predetermined pitch at which said plurality of color filter cells are repeatedly arranged.

38. An image pickup appparatus according to claim 34, further comprising low-pass filters for filtering each of the color signals separated by said color separation means.

39. An image pickup apparatus according to claim 34, wherein said control means is operable to adjust the white balance of the set of level-adjusted signals.

40. An image pickup apparatus comprising:
iris means for controlling the quantity of light from an optical image;
image pickup means for converting said light-controlled optical image into an electrical signal;
a color separation filter including a plurality of color filters arranged at a predetermined pitch;
separating means for separating a plurality of color signals from said electrical signal;
dot-sequential signal forming means for forming a dot-sequential signal from said plurality of color signals; and
processing means for generating a luminance signal from said dot-sequential signal.

41. An image pickup apparatus according to claim 40, wherein said light-controlled optical image impinges on said image pickup means, and further comprising means for controlling said iris means to control the quantity of light impinging on said image pickup means based on the level of a signal formed from said dot-sequential signal.

42. An image pickup apparatus comprising:
iris means for controlling the quantity of light from an optical image;
image pickup means for converting said light-controlled optical image into an electrical signal;
a color separation filter including a plurality of color filters arranged at a predetermined pitch;
separating means for separating a plurality of color signals from said electrical signal;
a multiplexer for forming a dot-sequential signal from said plurality of color signals; and
control means for controlling the level of said electrical signal based on the level of a signal which is generated from said dot-sequential signal.

43. An image pickup apparatus according to claim 42, wherein said control means includes an iris.

44. An image pickup apparatus according to claim 42, further comprising processing means for generating a luminance signal from said dot-sequential signal.

* * * * *

UNITED STATES PATENT AND TRADEMARK OFFICE
CERTIFICATE OF CORRECTION

PATENT NO. : 4,751,567
DATED : June 14, 1988
INVENTOR(S) : SEIJI HASHIMOTO

It is certified that error appears in the above-identified patent and that said Letters Patent is hereby corrected as shown below:

COLUMN 1

Line 25, "simple" should read --simply--.
    Line 45, "readout" should read --read out--.

COLUMN 3

Line 43, "EMBODIEMTNS" should read --EMBODIMENTS--.
    Line 54, "Sq" should read --Sg--.

COLUMN 5

Line 1, "subtractors;" should read --subtracters;--.
    Line 36, "subtractor 25" should read --subtracter 25--.
    Line 60, "was" should read --is--.

COLUMN 6

Line 13, "are" should read --or--.
    Line 15, "are" should read --or--.

Line 59, "of" should read --for--.

COLUMN 7

Line 9, "is separated" should be deleted.

UNITED STATES PATENT AND TRADEMARK OFFICE
CERTIFICATE OF CORRECTION

PATENT NO. : 4,751,567
DATED : June 14, 1988
INVENTOR(S) : SEIJI HASHIMOTO

It is certified that error appears in the above-identified patent and that said Letters Patent is hereby corrected as shown below:

COLUMN 10

Line 37, "the signals" should read --the second set of level-adjusted signals--.

COLUMN 12

Line 3, "appparatus" should read --apparatus--.

Signed and Sealed this

Second Day of May, 1989

Attest:

DONALD J. QUIGG

Attesting Officer

Commissioner of Patents and Trademarks